United States Patent
Lixl et al.

(10) Patent No.: US 6,607,178 B1
(45) Date of Patent: Aug. 19, 2003

(54) THRUST DEVICE, FUEL INJECTION VALVE HAVING SUCH A DEVICE, AND METHOD FOR MANUFACTURING A THRUST TRANSFER ELEMENT

(75) Inventors: Heinz Lixl, Regensburg (DE); Guenter Lewentz, Regensburg (DE); Wilhelm Frank, Bamberg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/509,455
(22) PCT Filed: Mar. 29, 1998
(86) PCT No.: PCT/DE98/02887
§ 371 (c)(1), (2), (4) Date: Dec. 1, 2000
(87) PCT Pub. No.: WO99/17014
PCT Pub. Date: Apr. 8, 1999

(30) Foreign Application Priority Data

Sep. 29, 1997 (DE) .......................... 197 42 968

(51) Int. Cl.⁷ ............................... F16H 21/44
(52) U.S. Cl. ............... 251/229; 74/110; 239/102.2
(58) Field of Search .................. 251/229, 129.2, 251/58; 239/88, 584, 102.2; 74/110

(56) References Cited

U.S. PATENT DOCUMENTS

| | | | | |
|---|---|---|---|---|
| 3,945,261 A | * | 3/1976 | Wright | 74/110 |
| 4,101,076 A | * | 7/1978 | Bart | 239/584 |
| 4,609,178 A | * | 9/1986 | Baumann | 251/229 |
| 4,684,103 A | * | 8/1987 | Baumann | 251/58 |
| 4,729,544 A | * | 3/1988 | Baumann | 74/110 X |
| 4,791,856 A | * | 12/1988 | Heim et al. | 92/84 |
| 4,875,404 A | * | 10/1989 | Aldridge | 74/110 X |
| 5,253,671 A | * | 10/1993 | Kolenc | 74/110 X |
| 5,516,075 A | * | 5/1996 | Itoi et al. | 251/58 |
| 5,556,072 A | * | 9/1996 | Itoi et al. | 251/58 |
| 5,803,361 A | * | 9/1998 | Horiuchi et al. | 239/88 |
| 5,906,353 A | * | 5/1999 | Someya et al. | 251/58 |
| 6,186,474 B1 | * | 2/2001 | Fitzner et al. | 251/229 |

FOREIGN PATENT DOCUMENTS

| | | |
|---|---|---|
| EP | 0 295 770 | 12/1988 |
| EP | 0 790 402 A2 | 8/1997 |
| JP | 4-38177 | 2/1992 |

* cited by examiner

Primary Examiner—Ehud Gartenberg
Assistant Examiner—Eric Keasel

(57) ABSTRACT

A device for transferring a thrust, a fuel injection valve with such a device, and a method for manufacturing such a thrust transferring device. To transfer the thrust of an actuator, especially in an injection valve, mechanical tappets are used, which have substantially the shape of a cylinder whose defining surfaces are substantially triangular, with the corners rounded. By the great width of the tappet, broad contact areas are created so that friction during the transfer is reduced.

24 Claims, 8 Drawing Sheets

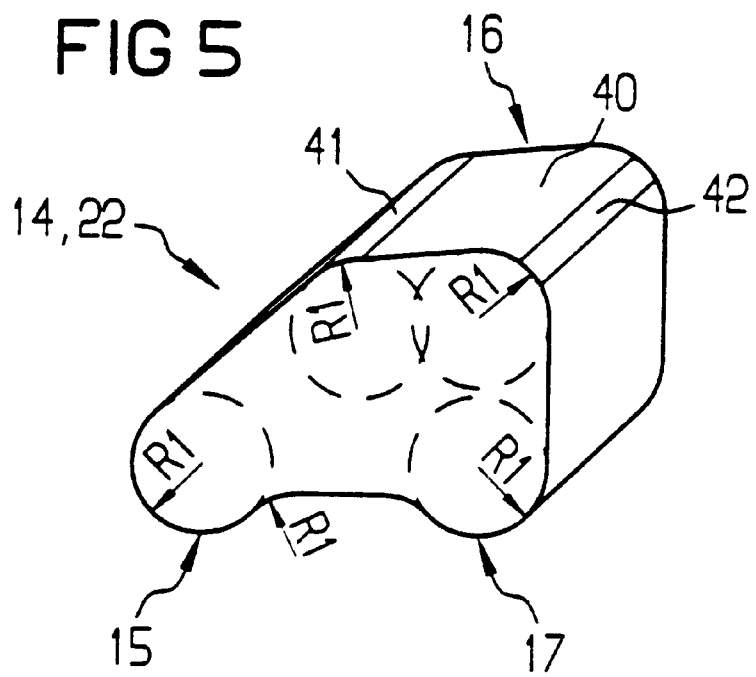
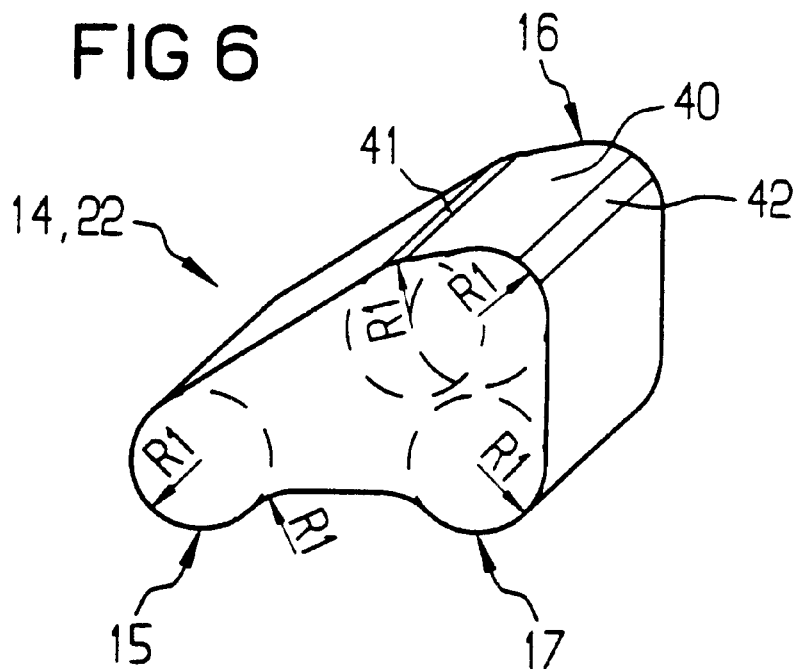

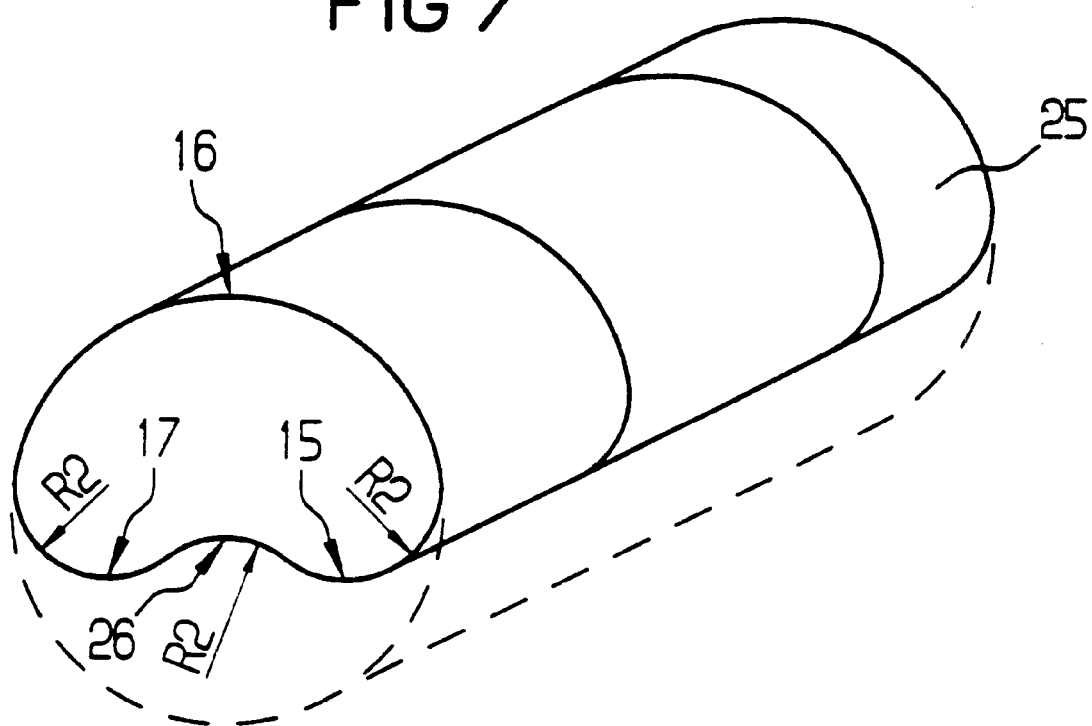

THRUST DEVICE, FUEL INJECTION VALVE HAVING SUCH A DEVICE, AND METHOD FOR MANUFACTURING A THRUST TRANSFER ELEMENT

CROSS REFERENCE TO RELATED APPLICATIONS

This application claims the benefit of priority based on PCT Application PCT/DE98/02887, filed Mar. 29, 1998, and German Application No. 19742968.8, filed on Sep. 29, 1997, which are incorporated by reference herein in their entirety.

BACKGROUND OF THE INVENTION

The present invention relates to a device for transferring the thrust of an actuator, an injection valve with such a device, and a method for manufacturing a tappet, such as may be used in such a device.

U.S. Pat. No. 4,101,076 to Bart discloses a conventional fuel injection valve which directly operates a fuel injector needle through a mechanical tappet. The tappet has two lever arms of different length, which are arranged at right angles to one another and are joined together at a bearing area. The shorter lever arm is associated with the piezoelectric actuator and the longer lever arm with the injector needle. The tappet is fulcrumed in the bearing area on the housing of the fuel injection valve. The thrust of the piezoelectric actuator is converted by the different lengths of the two lever arms to a greater thrust of the injection needle.

These conventional valves suffer from a number of disadvantages, including the fact that their tappets are insufficiently stiff, which leads to inaccuracy in the transfer of the thrust, especially in the case of highly dynamic operations.

SUMMARY OF THE INVENTION

The present invention provides a device for transferring the thrust of an actuator, which is simple in design and can be manufactured at low cost. An important advantage of the present invention lies in the shape of the tappet, which assures great rigidity, thereby ensuring that thrust is directly transferred, even in highly dynamic processes. Another advantage of the present invention is that the tappets can be manufactured with great accuracy and precision.

The present invention is achieved by providing a device for transferring thrust between an actuator and a plunger. The actuator moves a first displacement relative to a body, and the plunger moves a second displacement relative to the body. The device comprises a tappet having a first end face, a second end face spaced along an axis from the first end face, and a cylindrical surface surrounding the axis and extending between the first and second end faces, the cylindrical surface having a first contact portion adapted for contiguously engaging the body, a second contact portion adapted for contiguously engaging the actuator, and a third contact portion adapted for contiguously engaging the plunger; and a guide having first and second surfaces, the first surface confronting the first end face and the second surface confronting the second end face such that movement of the tappet along the axis is substantially prevented.

The present invention is also achieved by providing an injector for supplying fuel to a combustion chamber. The injector comprises a body; an actuator generating a thrust with respect to the body; a plunger displaceable with respect to the body by the thrust; a tappet transferring the thrust from the actuator to the plunger; and a guide. The tappet has a first end face, a second end face spaced along an axis from the first end face, and a cylindrical surface surrounding the axis and extending between the first and second end faces. The cylindrical surface has a first contact portion contiguously engaging the body, a second contact portion contiguously engaging the actuator, and a third contact portion contiguously engaging the plunger. The guide has a first surface confronting the first end face and a second surface confronting the second end face, such that movement of the tappet along the axis is substantially prevented.

The present invention is further achieved by providing a method of producing a tappet. The tappet has a first end face, a second end face spaced along an axis from the first end face, and a cylindrical surface surrounding the axis and extending between the first and second end faces. The cylindrical surface has a first contact portion contiguously engaging a body, a second contact portion contiguously engaging an actuator, and a third contact portion contiguously engaging a plunger. The method comprises providing an elongated, right-circular cylindrical rod; machining the rod lengthwise such that a transverse cross-sectional shape of the rod corresponds to a desired shape of the end faces; and cutting the rod transversely so as to provide a plurality of the tappets.

BRIEF DESCRIPTION OF THE DRAWING

The accompanying drawing, which is incorporated herein and constitutes part of this specification, illustrates presently preferred embodiments of the invention, and, together with the general description given above and the detailed description given below, serves to explain features of the present invention.

FIG. 5 is a perspective view of a second tappet according to the present invention.

FIG. 6 is a perspective view of a third tappet according to the present invention.

FIG. 7 is a perspective view of a fourth tappet according to the present invention.

DETAILED DESCRIPTION OF THE PREFERRED EMBODIMENTS

Figure 1:
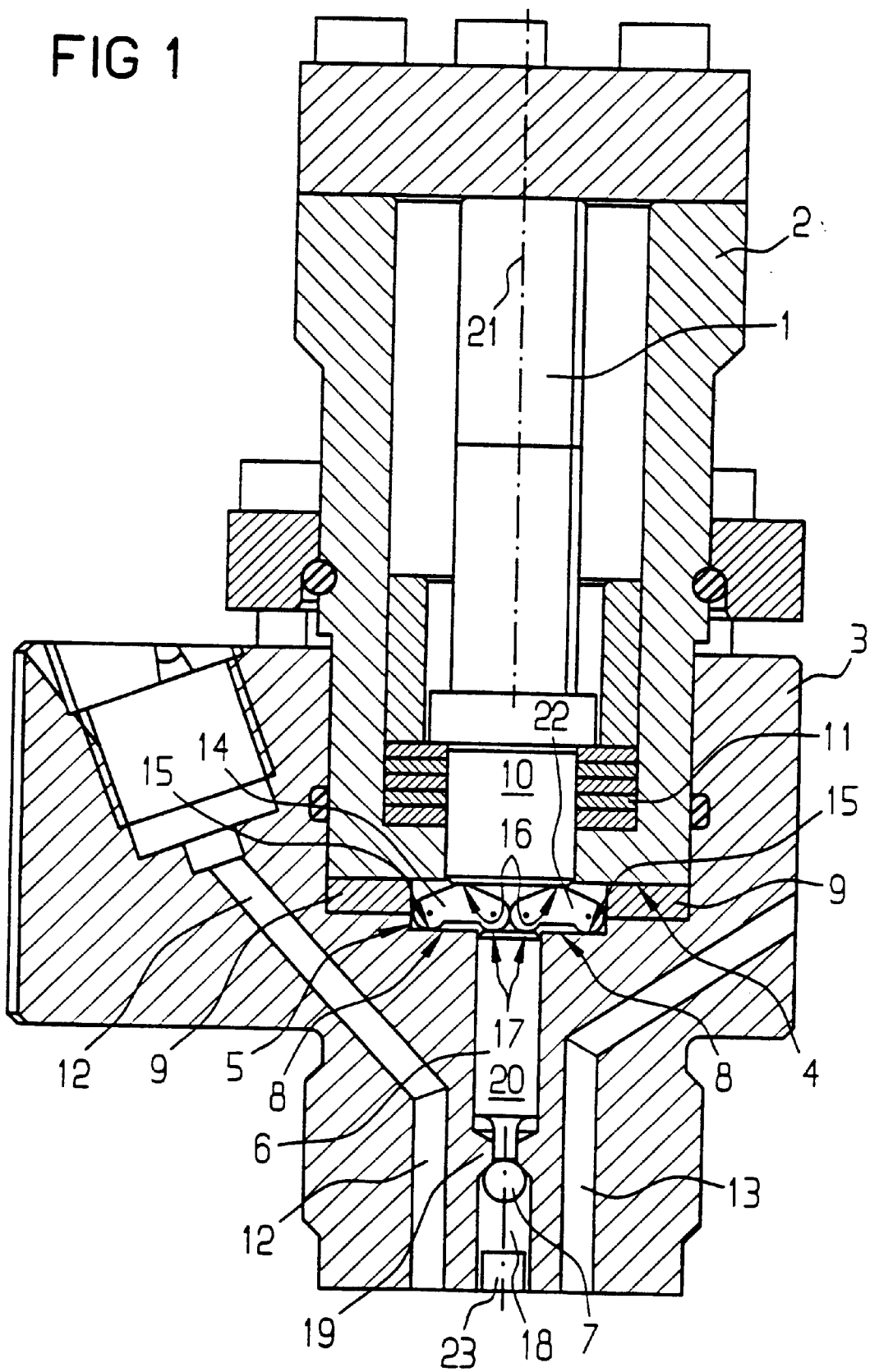
FIG. 1 is a cross-section view of a fuel injection valve according to the present invention having two tappets.

FIG. 1 shows schematically a portion of a fuel injection valve with an actuator 1, which can be a piezoelectric actuator. The actuator 1 is placed in a housing 2 and generates thrust against the bias of springs 11, which are mounted in the housing 2. An upper end of the actuator 1 is in contact with a cover plate of the housing 2. And the second end of the actuator 1 lies against an actuator piston 10 which is of cylindrical shape and is guided in a cylindrical recess in the housing 2.

The housing 2 is inserted into an opening 4 of a valve body 3 and tightly fastened by screws to the valve body 3. In the opening 4 there is a spacer ring 9 on which the housing 2 is supported. The opening 4 has a central, circular recess 5 is connected by a bore 20 to a valve seat 19 and a control chamber 18. Within the bore 20, a plunger 6, in the form of a piston, is guided with a tip extending through the valve seat 19. A valve body 7 at the end of the tip is in contact with the valve seat 19 and seals the control chamber 18 against the bore 20.

Between the actuator piston 10 and the plunger 6 are two mechanical tappets 14 and 22. The two tappets 14 and 22 are arranged symmetrically on opposite sides of the central axis 21. The tappets 14,22 are of identical shape and placed in the recess 5. The recess 5 has an annular bearing surface 8 that is formed by the valve housing 3, and is disposed substantially perpendicular to the direction of movement of the plunger 6 and parallel to the thrusting face of the actuator piston 10. The actuator piston 10 and the plunger 6 are symmetrical with one another and centered on the central axis 21. Of course, one or more than two tappets may be symmetrically positioned around the central axis 21.

Each of the tappets 14,22 has a first contact area 15 lying on the fulcrum surface 8. Also, each tappet 14,22 has a third contact area 17 that lies on the top of the plunger 6. Furthermore, a second contact area 16 of each tappet 14 is in contact with the actuator piston 10. The second contact area 16 lies between the first and third contact areas 15,17, while the first and third contact areas 15 and 17 are disposed on the bottom of the tapped, and the second contact area 16 is disposed on the top of the tappet 14.

The tappets 14,22 are fixed in their position perpendicular to the movement direction of the actuator 10 and of the plunger 6 by the recess 5 and by the spacer ring 9. The spacer ring 9 has a through-opening in which the tappets 14,22 are placed such that the first and the second tappets 14,22 are arranged in symmetry with one another, with the central axis 21, and with the actuator piston 10 and the plunger 6.

Figure 2A:
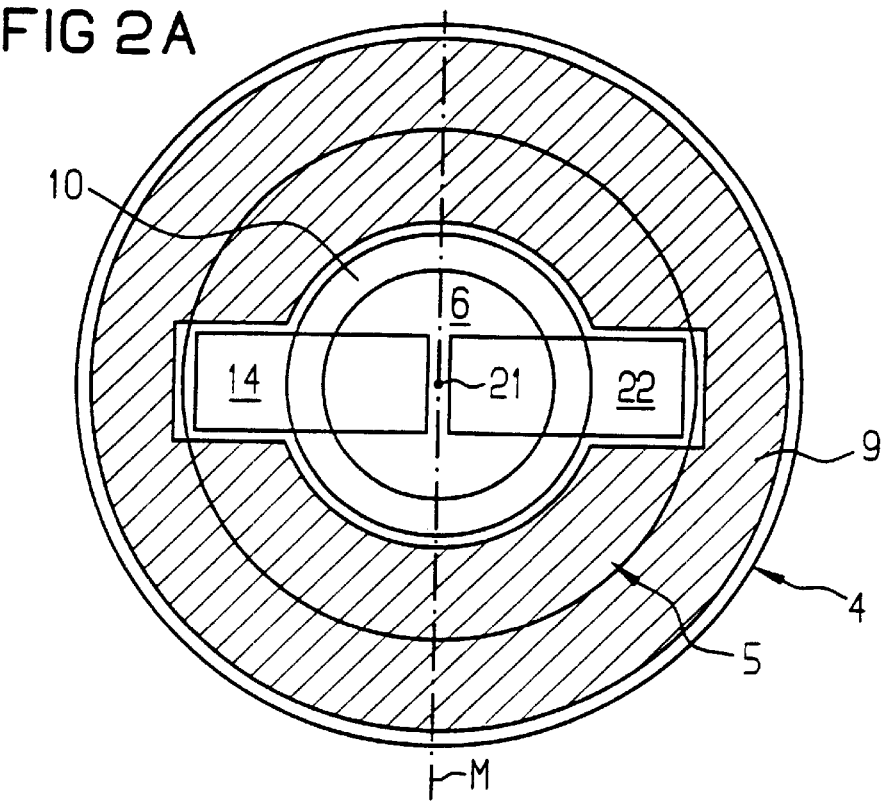
FIGS. 2A and 2B are schematic views illustrating the tappets and guide plate of the fuel injection valve shown in FIG. 1.

FIG. 2A shows a schematic top view of the arrangement of the actuator piston 10 with respect to the first and the second tappets 14,22 and the plunger 6. The actuator piston 10 has a larger diameter than the plunger 6. Also shown is the circular opening 4 and the recess 5 symmetrical with the opening 4. The recess 5 can have the same shape as the opening 4, e.g., a circular shape. In the recess 5, the first and the second tappets 14,22 are positioned symmetrically with an axis of symmetry M that passes through the central axis 21.

In FIG. 2A, the spacer ring 9, which is shown hatched, is of circular shape and its outside circumference corresponds substantially to the opening 4.

Figure 2B:
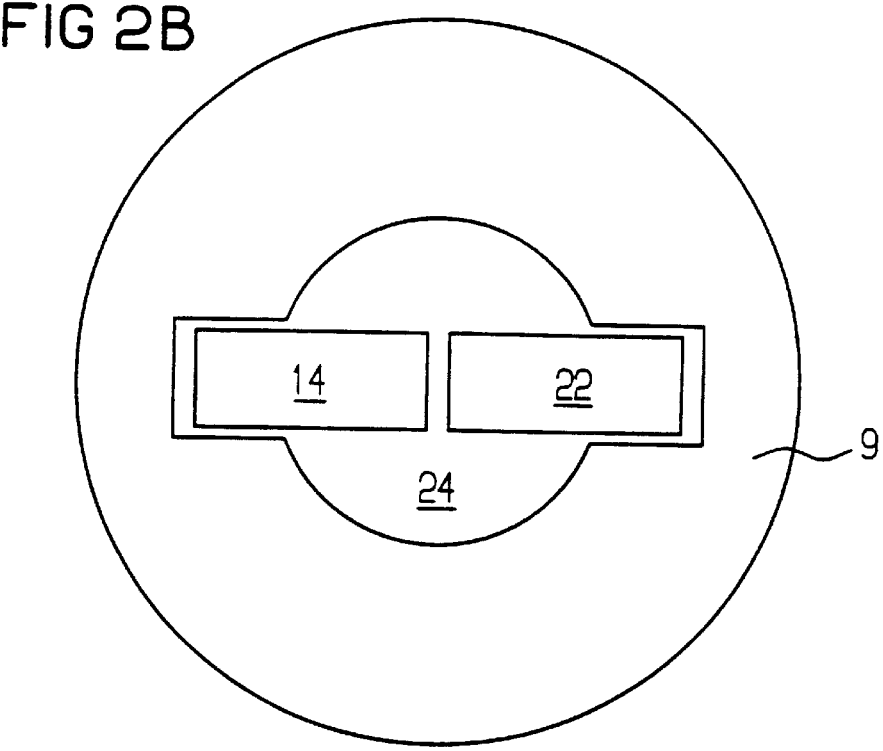

The spacer ring 9 is shown again more clearly in FIG. 2B. The spacer ring 9, which also functions as a guide disk, has an adjustment recess 24 that has a substantially rectangular shape with a centrally located circle superimposed thereon. The rectangular shape guides and maintains the first and second tappets 14,22 in symmetry with one another on one axis. The central circular recess enables the round actuator piston 10 to move unhampered toward the first and second tappets 14,22. Therefore, the circular portion of the adjusting recess of the spacer ring 9 is at least as large as the cross-section of the actuator piston 10.

The operation of the system represented in FIG. 1 will now be described. When the piezoelectric actuator 1 is operated, the actuator 1 elongates toward the plunger 6 against the force of the springs 11. The actuator piston 10 thus presses against the second contact surface 16 of the first and second tappet 14,22. The first and second tappets 14,22 are each in contact at a first contact area 15 with the fulcrum surface 8 of the valve housing 3. Also, the first and second tappets 14,22 have a third contact surface 17 in contact with the plunger 6. The plunger 6 is movable in the bore 20. The pressure of the actuator piston 10 causes the first and second tappets 14,22 to thrust with the first contact area 15 against the valve body 3 and move into a working position in which the plunger 6 is driven by the third contact area 17 toward the valve 7.

In this manner the valve 7 is moved apart from the associated valve seat 19 and the control chamber 18 is opened, so that fuel, for example, which is present under high pressure in the control chamber 18, can flow through the bore 20 to an outlet. Simultaneously fuel flows through a first throttle and a feed passage 12 at high pressure into the control chamber 18. With the valve seat 19 open, however, more fuel flows down than flows through the throttle. Thus the pressure in the control chamber drops. In the control chamber 18, an adjusting piston 23 is provided which transfers the pressure in the control chamber 18 to a valve needle. The valve needle is associated with a fuel injector and, depending on the pressure in the control chamber, opens or closes the fuel injector for injecting fuel into an internal combustion engine. The injector is also connected to a passage 12 which carries fuel under high pressure.

When power to the actuator 1 is shut off, the actuator 1 shortens and is urged upward by the springs 11 and by the first and second tappets 14,22 toward the top cover of the housing 2, i.e., toward its initial position. The pressure in the control chamber 18 forces the valve 7, which can be spherical in shape, against the valve seat 19 and simultaneously forces the plunger 6 toward the first and the second tappets 14,22. Thus, the first and the second tappets 14,22 are returned to the starting position.

The first and second tappets 14,22 pivot about centers which are located over the first contact area 15 of the first and second tappets 14,22. Since the second contact area 16 at which the actuator piston 10 lies on the first and second tappets 14,22 is at a shorter distance from those centers than from the third contact area 17, the lengthening of the actuator is converted to a greater motion of the plunger 6.

An especially precise and easy operation of the plunger 6 is achieved if the first and the second tappets 14,22 are adjusted precisely to one another, to the actuator piston and to the plunger 6 by the spacer ring 9. Preferably, by an appropriate selection of the thickness of the spacer ring 9, an adjustment of the space between the actuator piston 10 and the first and second tappets 14,22 is achieved, and thus also an adjustment of the space between the actuator piston 10 and the plunger 6. The precise adjustment of the first and of the second tappets 14,22, which also does not interfere with the actuator piston 10, is achieved essentially by the adjusting recess 24 which is located in the spacer ring 9. What is important is the special shape of the adjusting recess 24, which can be formed as a rectangle with a centrally superimposed circle. In a simple embodiment of the spacer ring 9, the adjusting recess is configured only as a quadrangular recess.

Figure 3:
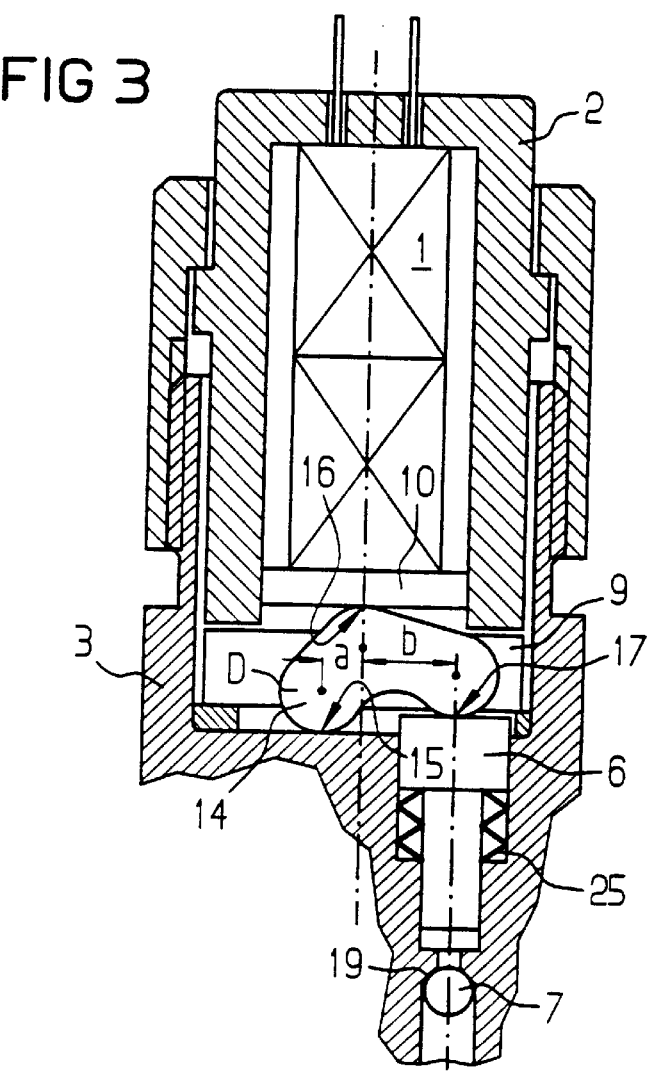
FIG. 3 is a cross-section view of a fuel injection valve according to the present invention having a tappet.

FIG. 3 shows an additional embodiment of a fuel injection valve in which only a single tappet 14 is provided in order to transfer the thrust of the actuator 1. The tappet 14 lies with its first contact area 15 on the fulcrum surface 8 of the valve body 3 and is carried by the guiding ring 9. The second contact area 16 is in contact with the actuator piston 10. The third contact area 17 of the tappet 14 lies on the center of the plunger 6. The arrangement in FIG. 3 operates the same as the arrangement in FIG. 1, except that the thrust of the actuator 1 is transferred to the plunger 6 through a single tappet 14.

In FIG. 3, "D" indicates the center of rotation of the tappet 14. The center D is situated vertically above the first contact area 15. The second contact area 16 has a first effective distance a from center D. The expression "effective distance," as it is used in connection with the present invention, means the distance that is important to a lever action. The third contact area 17 is at a second effective distance b from the center D. The leverage ratio Ü is defined by Ü=a/b. The first and the second effective distances a and b are established by the shape of the tappet, and thus the leverage ratio as well.

Instead of the arrangement with a single tappet according to FIG. 3, or the arrangement with two tappets according to FIG. 1, a greater number of tappets can also be used. However, for a low-friction operation of the plunger 6, it is necessary that the thrust of the actuator piston 10 be applied centrally or with a uniform distribution to the plunger 6, so as to prevent any skewing of the plunger 6. For that purpose it is necessary to align the tappets 14 and 22 symmetrically with the central axis 21 passing centrally through the plunger 6.

Figure 4:
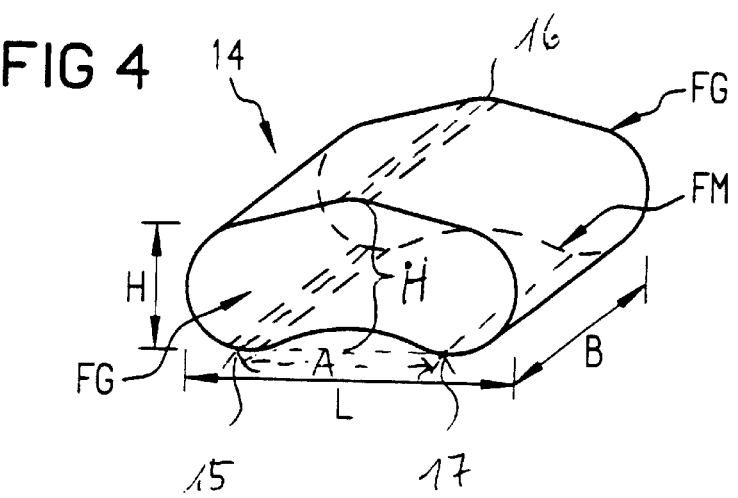
FIG. 4 is a perspective view of a first tappet according to the present invention.

FIG. 4 is a perspective view of a tappet 14. The tappet 14 has essentially the shape of a cylinder whose circumference FM is perpendicular to the end faces FG. The end faces FG are identical in shape. The end face FG is advantageously of a triangular shape wherein the corners are rounded.

In shaping the tappet 14, it is essential that the width B be exactly as great as the length L of the tappet. Due to the relatively great width B, elongated contact surfaces are achieved in the first, second and third contact areas 15,16,17, which are narrow but relatively long. Relatively large contact surfaces are thus achieved in the first, second and third contact areas 15,16,17. Thus, single-point application of pressure is avoided and a broad application of pressure is achieved at the actuator piston 10, the contact surface 8, the plunger 6 and the tappets 14 and 22.

The width of the contact surfaces 15,16,17 is established essentially by the curvature of the tappets 14 and 22 in their corresponding areas. The shape of the contact areas 15,16,17 is chosen such that, on the one hand, the leverage ratio is achieved, and on the other hand, wear by friction or seizure due to excessively great surface pressure will be minimized. The curvature in the area of the contact surfaces 15,16,17 is to be as small as possible. Also, the tappet 14 should be as high as possible so as to achieve as much rigidity as possible. The relative ratios of the height H, length L and width B of the tappet 14 are important, and is to be chosen such that sufficient rigidity is achieved for the given leverage.

The tappet 14 is slightly recessed on the bottom between the first and the third contact areas 15,17, so that the tappet 14 will definitely thrust against the fulcrum surface 8 and the actuator piston 6 only at the first and third contact areas 15,17, and also permit the tappet 14 to turn about the pivot center D without striking the valve body 3 in a different area.

Referring again to FIG. 4, the first, second and third contact areas 15,16,17 are represented with a broken line. The contact areas 15,16,17 are substantially in the form of a linear contact at which the first, the second and the third contact areas engage the actuator piston 10, the plunger 6 and the fulcrum surface 8, respectively. The distance between the first and third contact areas 15,17 is referred to as the lever width A. If the first and the third contact areas 15,17 lie on a flat plate, the lever height H is defined by the distance between the second contact area 16 and the flat plate. Tests have shown that sufficient rigidity is achieved in the tappet 14, assuming that there is little frictional movement of the lever at the contact areas, if the ratio of the lever height H to the lever width A (H:A) is less than or equal to 1. A preferred ratio of the lever height to the lever width H:A ranges between 1:4 and 3:4.5. With these dimensions, sufficient rigidity is achieved and, at the same time, the relative movement of the tappet 14 when the piezoelectric actuator stretches is reduced to a necessary minimum. In addition, tests have shown that the tappet 14 can have a width B of preferably 2 to 13 mm.

Figure 4A:
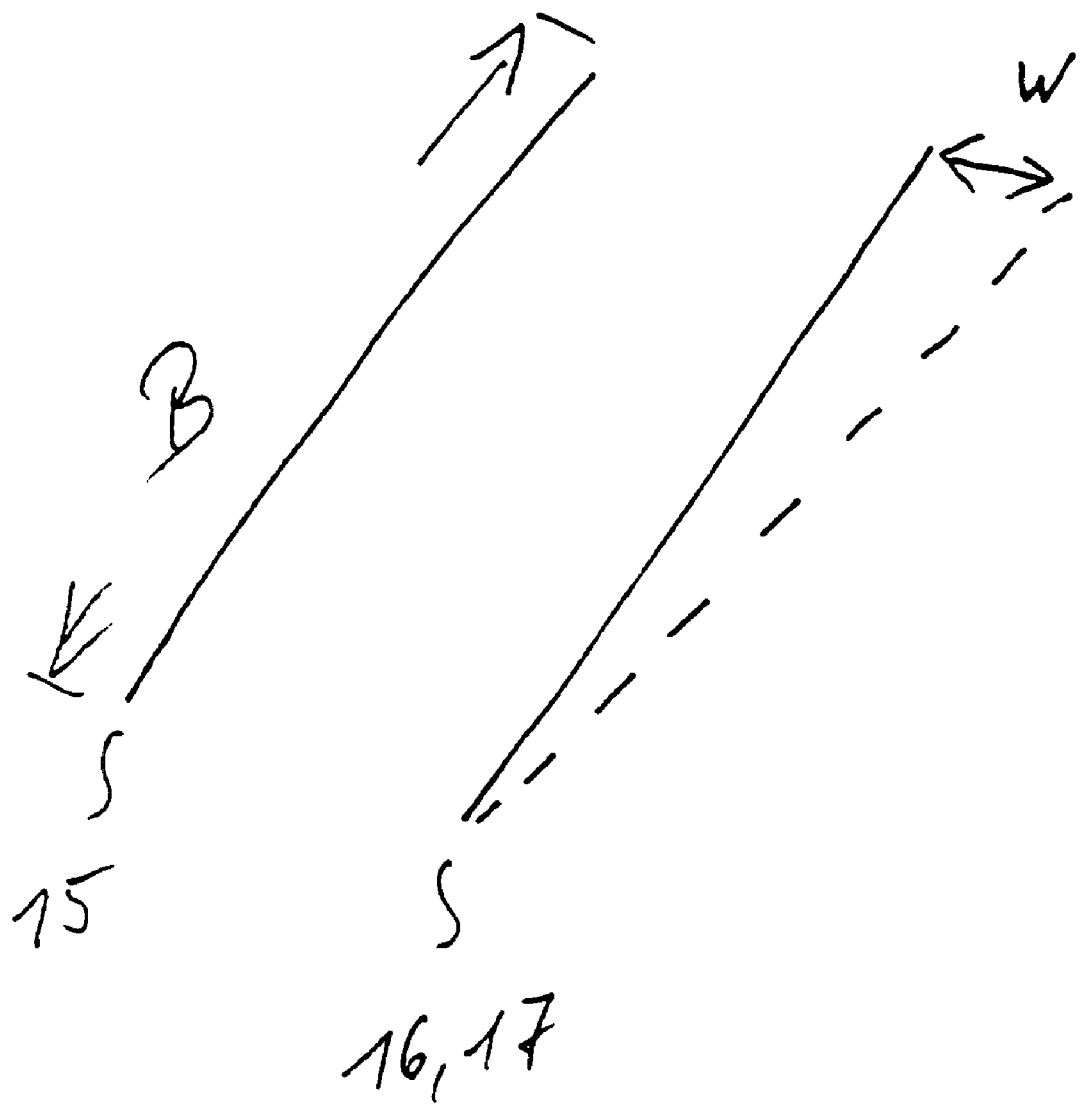
FIG. 4A illustrates certain features of the tappet shown in FIG. 4.

The stress on the tappet 14 is further reduced if the first, second and third contact areas 15,16,17, which are essentially contact lines, are as parallel as possible to one another. A preferred maximum departure in the parallelism between any two f the first, second and third contact lines is in the range of 50 $\mu$m, with a preferred lever width of up to 6 mm. The wear on the tappet 14 is further reduced if the first, second and third contact areas 15,16,17, which are configured as contact lines, have a parallelism deviation W between two contact lines which is less than 10 $\mu$m for a lever width of 6 mm. This is represented schematically in FIG. 4A.

Advantageously, the friction that occurs on the tappet 14 can be reduced if the surfaces of the tappet 14, especially in the area of the first, second and third contact areas 15,16,17 have a high surface quality value $R_z$ that is preferably less than 1 $\mu$m. $R_z$ is the rough depth according to DIN Standard 4768. Also, with a hardness of more than 60 HRC (Rockwell hardness), a tappet can be made that will withstand great stresses.

The friction forces which attack the tappet 14 are also reduced by lubrication such as, for example, having the tappet run in the fuel leakage of the injector.

An additional advantageous embodiment of the tappet 14 consists in providing at least the first, second and third contact areas 15,16,17 with a surface coating that reduces friction in the movement of the tappet 14 and also satisfies the stringent requirements of surface quality and hardness. Preferably a titanium nitride layer serves as that coating. The tappet 14 can be made of a very stiff material with a modulus of elasticity that is greater than that of steel, for example, greater than 500,000 N/mm$^2$.

Furthermore, tests have shown that the rounding radii of the first, second and third contact areas 15,16,17 can range from 5 to 30 mm. It has been found that it is advantageous if the ratio between the rounding radius R1,R2 and the force with which the first, second and third contact areas are applied to a contact point is as follows: radius/contact force$\leq$7.5 mm/1000 Newtons. This ratio advantageously reduces wear on the tappet 14.

The above-given dimensions of the tappet 14 are not limited solely to the embodiment represented in FIG. 4, but are also advantageous in other forms, as for example those represented in FIGS. 5 and 6.

An advantage of using only one tappet 14, as shown in FIG. 3, is that the manufacturing costs are lowered and the amount of space required is reduced.

FIG. 5 shows an advantageous form of the tappet 14. The essential shape of the tappet 14 is that of a cylinder whose defining surfaces correspond largely to a triangle with rounded corners. Also, the tappet 14 is made as wide as possible perpendicular to the direction of rotation, i.e., the cylinder is relatively long for the size of the defining surfaces. The rigidity of the tappet is thereby increased. The first, second and third contact areas are each provided with a curvature of a given radius. These areas substantially constitute the shape of a cylinder. The radius of curvature is preferably identical in the first, second and third contact areas 15,16,17.

The tappet of FIG. 5 has an upper, preferably planar surface 40 extending from a first rounded area 41 to a second rounded area 42. The first and the second rounded areas 41 and 42 are associated lengthwise with the cylindrical shape of the tappet. The second rounded area 42 is disposed above the third contact surface 17. The first rounded area 41 is between the first and the second contact surface 17. The tappet surface 40 is inclined upwardly toward the second rounded area 42, i.e., slopes upwardly. The tappet surface 40 merges at the two rounded areas 40 and 41 with a curvature with the radius R1. The function of the inclined surface 40 is based on the fact that the actuator piston in the rest position lies on the second rounded area 42, which is higher than the first rounded area 41. Thus the second contact area 16 is disposed on the second rounded area 42. The third contact area 17 is underneath the second contact area 16, and the third and second contact area are the same lateral distance from the first contact area 15. When the actuator piston 10 is driven, the motion is transferred directly, i.e., in direct ratio, through the third contact area 17 to the associated plunger 6.

When the actuator piston 10 is driven further, the second contact area 16 shifts on the tappet surface 40 toward the first rounded area 41. Thus, the lateral distances at which the second and the third contact area 16 and 17 are situated from the first contact area 15 are different, i.e., the distance of the second contact area 16 decreases and the distance of the third contact area 17 remains the same. Thus, the motion of the actuator piston 10 is converted to a greater motion of the plunger 6. The leverage ratio between the motion of the actuator piston 10 and the motion of the plunger 6 increases as the motion of the actuator piston 10 increases. It is especially advantageous if, at the start of the motion of the actuator piston 10, the leverage ratio is one and then the leverage ratio increases.

The ratio between the movement of the actuator 1 and the movement of the plunger 6 is established by the upward slope of the tappet surface 40.

Thus, at first the valve 7 is driven away from the valve seat 19 with great force and a low ratio. For this action an application of great force is necessary. This is achieved by the direct ratio. If the valve 7 is lifted from the valve seat the pressure in the control chamber 18 decreases. At low pressure the force needed for the further opening of the drain is less, and a rapid opening of the drain increases the dynamic of the servo valve, so that a stepping up of the motion of the actuator piston advantageously occurs. On account of the variable ratio of the motion, the actuator 1 can be optimally adapted to its power. In addition, the dynamic is increased.

FIG. 6 shows an additional advantageous embodiment of the tappet, in which the first and second rounded areas 41,42 of the tappet surface 40 are closer together, and the pitch with which the tappet surface 40 rises from the first to the second rounded area is steeper. Thus the step-up ratio increases more rapidly with the motion of the actuator piston than in the embodiment in FIG. 5. Also, the maximum step-up ratio is lower than in FIG. 5, since the distance of the first rounded portion 41 from the second rounded portion 42 is less than in FIG. 5. Preferably, the pitch of the tappet surface 40 can also be equal to the pitch of the tappet surface 40 in the embodiment in FIG. 5.

FIG. 7 shows an additional advantageous embodiment of a tappet 14 which is machined from a cylindrical rod. First, the shape of the bottom side, which is between the first and third contact areas 15,17, is machined into the rod 25. Then the shaped rod is sliced into individual pieces. Thus, the pieces of the rod, which constitute the tappets 14, are made identical in shape and especially identical in the first, the second and the third contact areas 15,16,17. A slight variation in the thickness of the tappets is less important to an accurate and precise operation of the plunger 6.

Preferably, the first contact area 15, the third contact area 17, and the recessed area 26 that is created in the tappet 14 on the underside of the tappet 14, have the same radius R2. In a further embodiment, the first and the third contact areas have a first radius and the recessed area 26 has a second, larger radius.

The shape is advantageously made in the rod 25 by grinding. The severing of the pieces is performed, for example, by wire erosion, laser cutting or electron-beam cutting. In a further embodiment, before the pieces are severed, the shape, i.e., the curvature of the second contact area 16, is made in the rod 25 if it is to be different from the curvature of the rod 25.

Figure 8:
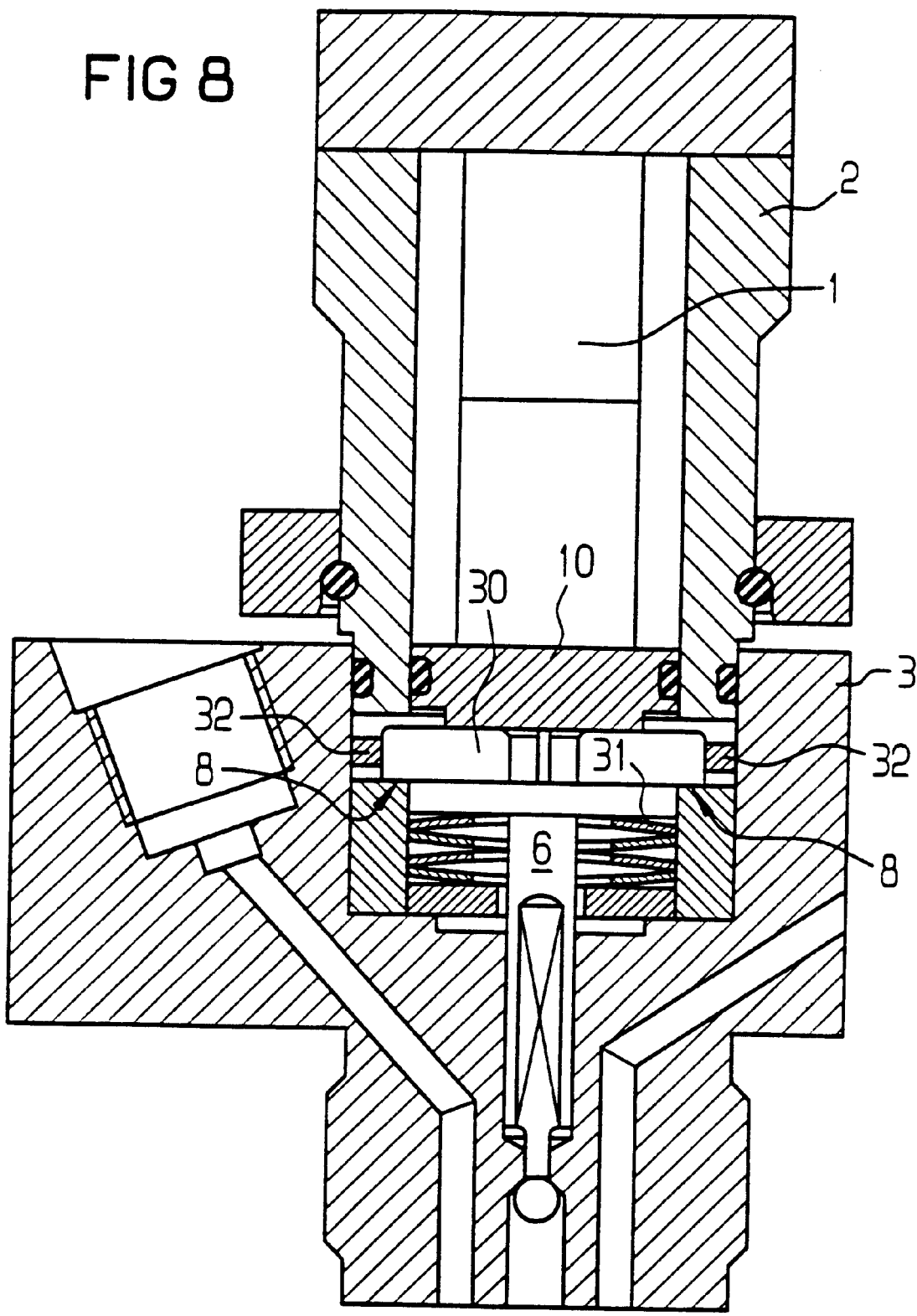
FIG. 8 is a cross-section view of a fuel injection valve according to the present invention having a plurality of tappets.

FIG. 8 shows another injection valve in which third tappets 30 are provided between the actuator piston 10 and the plunger 6. The plunger 6 is biased by leaf springs 31 toward the third tappet 30 and the actuator piston 10.

Figure 9:
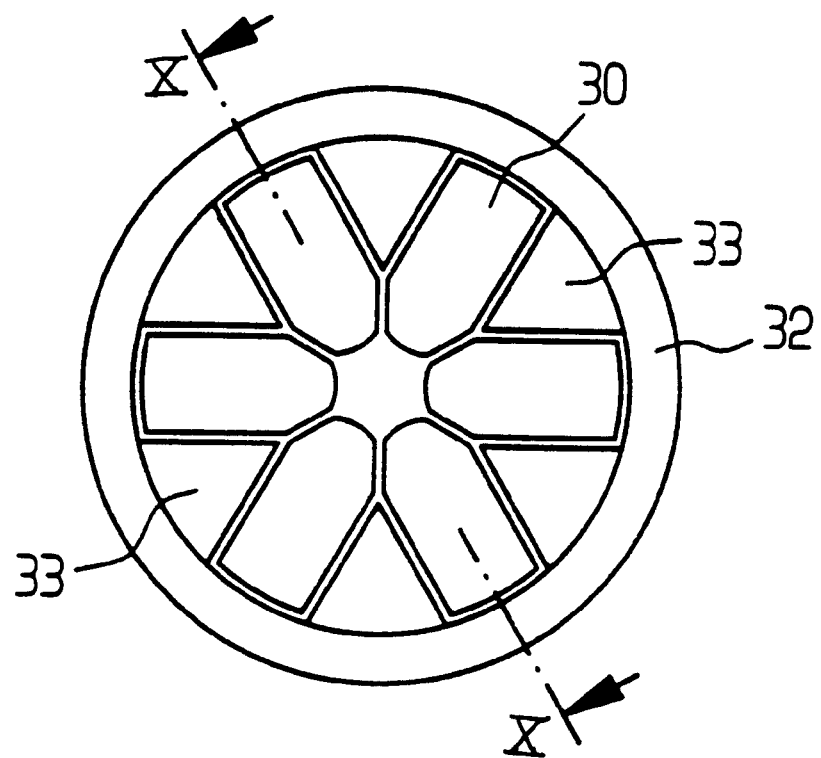
FIG. 9 is a schematic view of a fifth tappet according to the present invention.

FIG. 9 shows a top view of the third tappets 30 with an adjusting device 32. The adjusting device 32 is configured as a surrounding ring out of which guiding projections 33 point toward the center of the circle. Between each pair of guiding projections 33 a third tappet 30 is inserted.

The third tappet 30 is made essentially in the form of a flat plate which is slightly curved in the areas in which the actuator piston 10, the plunger 6 or the fulcrum surface 8 are engaged, so that the friction is reduced.

Figure 10:
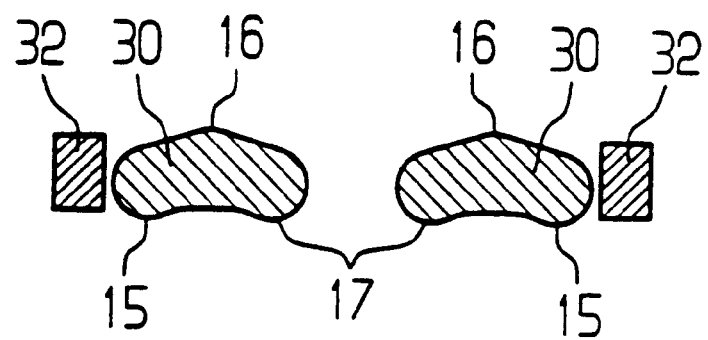
FIG. 10 is a cross-section taken along the line X—X in FIG. 9.

FIG. 10 shows the rounded first, second and third contact areas 15,16,17 of the tappet 30 in cross-section.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A device for transferring thrust between an actuator and a plunger, the actuator moving a first displacement relative to a body and the plunger moving a second displacement relative to the body, the device comprising:

a tappet having a first end face, a second end face spaced along an axis from the first end face, and a cylindrical surface surrounding the axis and extending between the first and second end faces, the cylindrical surface having a first contact portion adapted for contiguously engaging the body, a second contact portion adapted for contiguously engaging the actuator, and a third contact portion adapted for contiguously engaging the plunger, the first contact portion including a circumferential segment of a first right circular cylinder having a first radius, the second contact portion including a circumferential segment of a second right circular cylinder having a second radius, and the third contact portion including a circumferential segment of a third right circular cylinder having a third radius, the first, second, and third radiuses being equal; and a guide having first and second surfaces, the first surface confronting the first end face and the second surface confronting the second end face such that movement of the tappet along the axis is substantially prevented.

2. The device according to claim 1, wherein the tappet pivots parallel to the axis.

3. The device according to claim 1, wherein the first and second end faces are substantially parallel, and the first and second surfaces are substantially parallel.

4. The device according to claim 1, wherein a ratio of a first effective distance between centers of rotation of the first contact portion and the second contact portion to a second effective distance between centers of rotation of the second contact portion and the third contact portion substantially equals a ratio of the first displacement to the second displacement.

5. The device according to claim 1, wherein at least one of the first, second, and third contact portions extends between the first and second end faces.

6. The device according to claim 5, wherein each of the first, second, and third contact portions extend between the first and second end faces.

7. The device according to claim 1, wherein a plurality of tappets are arranged symmetrically about a line of action coincident with the first and second displacements, and each of a corresponding plurality of guides prevent axial movement of a respective one of the plurality of tappets.

8. The device according to claim 7, wherein a pair of tappets are arranged diametrically opposite the line of action, and a disk surrounding the line of action comprises a pair of guides, each of the pair of guides receives a respective one of the pair of tappets.

9. The device according to claim 7, wherein a ring circumscribes the plurality of tappets and connects each of the plurality of guides.

10. The device according to claim 9, wherein the ring includes a corresponding plurality of wedge-shaped elements having respective apexes pointing toward the line of action, each of the plurality of wedge-shaped elements providing the first surface confronting the first end face of a first tappet and the second surface confronting the second end face of a second tappet, the first and second tappets being circumferentially adjacent to one another, and the first and second surfaces of each of the plurality of wedge-shaped elements intersecting one another at the respective apex.

11. A device for transferring thrust between an actuator and a plunger, the actuator moving a first displacement relative to a body and the plunger moving a second displacement relative to the body, the device comprising:

a tappet having a first end face, a second end face spaced along an axis from the first end face, and a cylindrical surface surrounding the axis and extending between the first and second end faces, the cylindrical surface having a first contact portion adapted for contiguously engaging the body, a second contact portion adapted for contiguously engaging the actuator, and a third contact portion adapted for contiguously engaging the plunger, at least one of the first, second, and third contact portions being a circumferential segment of a right circular cylinder, the second contact portion including a first circumferential segment of a first right circular cylinder having a first radius, a second circumferential segment of a second right circular cylinder having a second radius, and a connecting portion extending between the first and second circumferential segments, the first and second radiuses being equal; and a guide having first and second surfaces, the first surface confronting the first end face and the second surface confronting the second end face such that movement of the tappet along the axis is substantially prevented.

12. The device according to claim 11, wherein the tappet pivots parallel to the axis.

13. The device according to claim 11, wherein the first and second end faces are substantially parallel, and the first and second surfaces are substantially parallel.

14. The device according to claim 11, wherein a ratio of a first effective distance between centers of rotation of the first contact portion and the second contact portion to a second effective distance between centers of rotation of the second contact portion and the third contact portion substantially equals a ratio of the first displacement to the second displacement.

15. The device according to claim 11, wherein at least one of the first, second, and third contact portions extends between the first and second end faces.

16. The device according to claim 15, wherein each of the first, second, and third contact portions extend between the first and second end faces.

17. The device according to claim 11, wherein a plurality of tappets are arranged symmetrically about a line of action coincident with the first and second displacements, and each of a corresponding plurality of guides prevent axial movement of a respective one of the plurality of tappets.

18. The device according to claim 17, wherein a pair of tappets are arranged diametrically opposite the line of action, and a disk surrounding the line of action comprises a pair of guides, each of the pair of guides receives a respective one of the pair of tappets.

19. The device according to claim 17, wherein a ring circumscribes the plurality of tappets and connects each of the plurality of guides.

20. The device according to claim 19, wherein the ring includes a corresponding plurality of wedge-shaped elements having respective apexes pointing toward the line of action, each of the plurality of wedge-shaped elements providing the first surface confronting the first end face of a first tappet and the second surface confronting the second end face of a second tappet, the first and second tappets being circumferentially adjacent to one another, and the first and second surfaces of each of the plurality of wedge-shaped elements intersecting one another at the respective apex.

21. An injector for supplying fuel to a combustion chamber, the injector comprising:

a body;

an actuator generating a thrust with respect to the body;

a plunger displaceable with respect to the body by the thrust;

a tappet transferring the thrust from the actuator to the plunger, the tappet having a first end face, a second end face spaced along an axis from the first end face, and a cylindrical surface surrounding the axis and extending between the first and second end faces, the cylindrical surface having a first contact portion contiguously engaging the body, a second contact portion contiguously engaging the actuator, and a third contact portion contiguously engaging the plunger, the first contact portion including a circumferential segment of a first right circular cylinder having a first radius, the second contact portion including a circumferential segment of a second right circular cylinder having a second radius, and the third contact portion including a circumferential segment of a third right circular cylinder having a third radius, the first, second, and third radiuses being equal; and a guide having first and second surfaces, the first surface confronting the first end face and the second surface confronting the second end face such that movement of the tappet along the axis is substantially prevented.

22. The injector according to claim 21, wherein a plurality of tappets are arranged symmetrically about a line of action coincident with displacement of the plunger, and each of a corresponding plurality of guides prevent an axial movement of a respective one of the plurality of tappets.

23. An injector for supplying fuel to a combustion chamber, the injector comprising:

a body;

an actuator generating a thrust with respect to the body;

a plunger displaceable with respect to the body by the thrust;

a tappet transferring the thrust from the actuator to the plunger, the tappet having a first end face, a second end face spaced along an axis from the first end face, and a cylindrical surface surrounding the axis and extending between the first and second end faces, the cylindrical surface having a first contact portion contiguously engaging the body, a second contact portion contiguously engaging the actuator, and a third contact portion contiguously engaging the plunger, the second contact portion including a first circumferential segment of a first right circular cylinder having a first radius, a second circumferential segment of a second right circular cylinder having a second radius, and a connecting portion extending between the first and second circumferential segments, the first and second radiuses being equal; and a guide having first and second surfaces, the first surface confronting the first end face and the second surface confronting the second end face such that movement of the tappet along the axis is substantially prevented.

24. The injector according to claim 23, wherein a plurality of tappets are arranged symmetrically about a line of action coincident with displacement of the plunger, and each of a corresponding plurality of guides prevent an axial movement of a respective one of the plurality of tappets.

* * * * *